J. C. BONNER.
TRANSPORTATION SYSTEM.
APPLICATION FILED MAY 17, 1918.

1,323,574.

Patented Dec. 2, 1919.
2 SHEETS—SHEET 2.

UNITED STATES PATENT OFFICE.

JOSEPH CLAYBAUGH BONNER, OF TOLEDO, OHIO.

TRANSPORTATION SYSTEM.

1,323,574.   Specification of Letters Patent.   Patented Dec. 2, 1919.

Application filed May 17, 1918. Serial No. 235,145.

*To all whom it may concern:*

Be it known that I, JOSEPH C. BONNER, a citizen of the United States, residing at Toledo, in the county of Lucas and State of Ohio, have invented certain new and useful Improvements in Transportation Systems, of which the following is a specification.

This invention relates to transportation systems; and it comprises, in combination, a carrying vehicle and a plurality of carried vehicles, the carried vehicles being arranged to straddle the carrying vehicle, and provided with means for forming a continuous side or "built up" car body, when in position on the carrying vehicle, and it further comprises a carrying vehicle, and a plurality of carried vehicles, each of which is provided with hinged doors and a folding footboard, and means connecting the doors and said footboard whereby the doors will be opened to form a continuation of the side of the wagon, when the wagon is loaded on the carrying vehicle; all as more fully hereinafter set forth and as claimed.

In another application Serial No. 867,865, filed October 11, 1914, I have described and claimed a transportation system comprising a carrying vehicle and one or more carried vehicles which are adapted to straddle the carrying vehicle and rest upon the same with the axes of their wheels below the horizontal plane of engagement. I have found that the cost of "re-handling" merchandise is a very large item in the total cost of transportation. Under present conditions, when an article of merchandise is shipped from one city to another, it is first loaded in a horse drawn or motor vehicle and carried to the freight station where it is unloaded and placed in a freight car. Loading and unloading is done by hand, and it is a slow process. It is necessary to handle merchandise several times before it reaches its final destination.

In loading the carried vehicles, which may, for convenience, be termed "road wagons" upon the carrying vehicles, which may, for convenience, be termed "freight cars" it is desirable that the road wagons be packed as closely as possible in order to eliminate "dead" space. It is also desirable to pack the wagons closely to one another in order that unauthorized persons may not enter the wagons and obtain the merchandise that is being transported.

In the present application I provide the road wagon with means for bridging the space betwen the back end of one wagon and the front end of an adjacent wagon and produce, in effect, a "built up" car body. The wagons are provided with doors at the front end and a hinged footboard. The footboard normally projects beyond the front of the wagon, and when the wagon is moved against the back of a preceding wagon the footboard is folded into inoperative position. Means are provided for connecting the footboard and doors so that the doors will be opened when the footboard is moved into inoperative position.

In the accompanying drawing, I have shown, more or less diagrammatically, an advantageous embodiment of this invention. In this showing—

Figure 1:
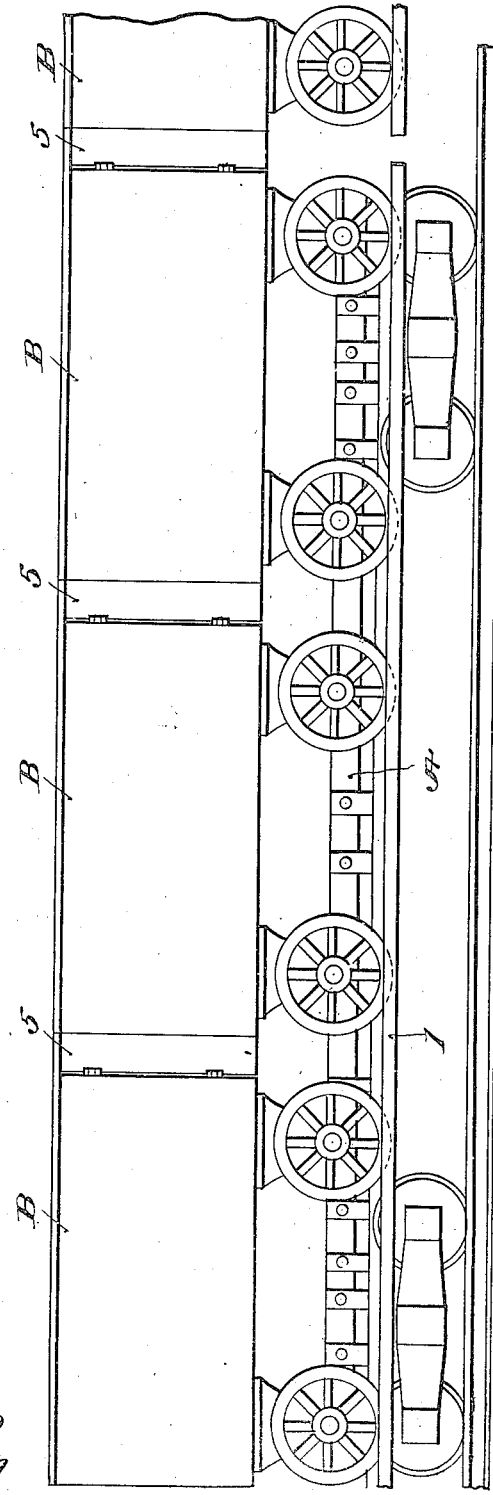
Figure 1 is a side elevation of a freight car showing a number of road wagons arranged in position upon the car.
Figure 2:
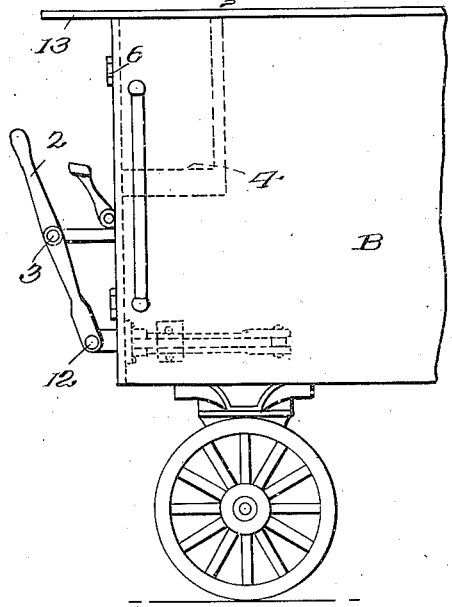
Fig. 2 is a side elevation of the forward end of a road wagon showing the footboard in normal position and the doors closed.

In the accompanying drawings the letter A represents a freight car upon which is mounted a number of road wagons B. As shown the road wagons straddle the flat top of the freight car and any means may be employed for supporting the wagons in this position. In the drawings I have shown a supporting track 1 of the type shown in my co-pending application Serial No. 158,879, filed March 31, 1917, arranged on the side of the freight car below the top and adapted to receive the lower treads of the wheels of the wagons.

Each of the wagons is provided with a footboard 2 which is hinged to the wagon at 3 and arranged in front of driver's seat 4. Doors 5 are arranged on the front of the wagon and hinged at 6. The doors are connected to the footboard by a link or lever 7 and lever 8. One end of lever 7 is pivotally secured to the door at 9 and the other end is pivotally connected to the second mentioned lever at 10. Lever 8 rides in the guide block 11 carried by the wagon body and is secured at one end to the footboard at a point 12. The roof of the wagon extends beyond the front end as at 13, a distance approximately equal to the width of the doors.

Figure 4:
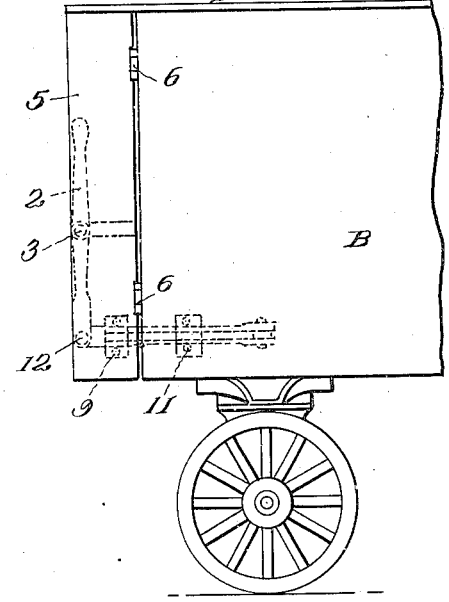
Fig. 4 is a side elevation of a portion of a road wagon showing the footboard in folded position and the doors opened.
Figure 3:
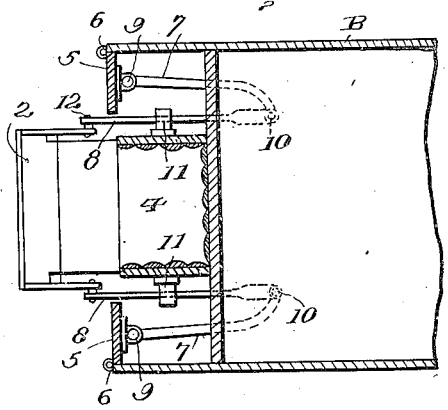
Fig. 3 is a horizontal sectional view of the wagon with the footboard and doors in the position shown in Fig. 2.
Figure 5:
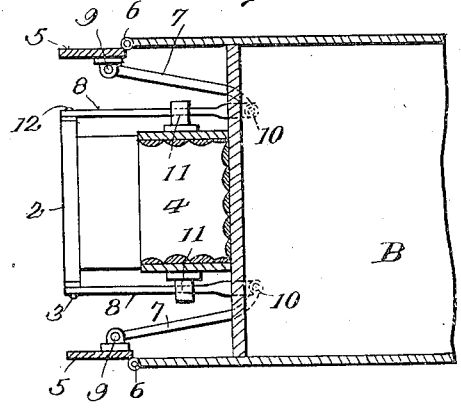
Fig. 5 is a horizontal sectional view showing the footboard and doors in the position shown in Fig. 4.

When the wagons are loaded upon a freight car, the footboard comes in contact with the back of the next preceding wagon and is forced into folded position shown in dotted lines in Fig. 4. When the footboard is folded lever 8 rides forward in guide block 11 causing lever 7 to move forward and open doors 5. As shown in Fig. 1, the doors, when opened, bridge the space between two wagons and form, in effect, a "built up" car body. The projecting portion 13 of the roof also bridges the space between two wagons. It is therefore practically impossible for unauthorized persons to enter the wagons. The freight car is generally provided with a cab (not shown) at the front end and the first wagon loaded upon the car will be positioned directly back of the cab so that its footboard will be folded in the manner just described.

What I claim is:—

1. A train of vehicles comprising a number of wagons spaced from each other, means upon each of the wagons to bridge the space between it and the next preceding wagon, said means forming continuations of the sides of the wagon body, and means for causing said first mentioned means to assume said position when the wagons are positioned.

2. A vehicle of the character described having a hinged footboard and doors arranged at the front of said vehicle and means connecting the doors and footboard whereby the doors will be opened when the footboard is in inoperative position.

3. A vehicle of the character described having a hinged footboard and doors, levers secured to the footboard and arms connected to said levers and said doors whereby the doors will be opened when the footboard is raised.

4. A train of vehicles comprising a number of wagons spaced from each other, means upon each of said wagons for engaging the preceding wagon, and means operable by said first mentioned means for bridging the space between two of said wagons to produce a continuous built up body.

5. A train of vehicles comprising a number of wagons spaced from each other, means upon each of said wagons for engaging the preceding wagon, and hinged doors on each of said wagons, said doors being connected to said means whereby the doors will be opened when said means engage said preceding wagon to produce a continuous wagon body.

6. A train of vehicles comprising a number of wagons spaced from each other, a folding footboard projecting beyond the front of said wagon, and arranged to contact with the preceding wagon, and hinged doors on each of said wagons, said doors being connected to said footboard whereby the doors will be opened when said means engage said preceding wagon to produce a continuous wagon body.

In testimony whereof, I affix my signature hereto.

JOSEPH CLAYBAUGH BONNER.